United States Patent
Wang et al.

(10) Patent No.: US 9,699,240 B2
(45) Date of Patent: Jul. 4, 2017

(54) CONTENT UPLOADING METHOD AND USER TERMINAL THEREFOR, AND ASSOCIATED CONTENT PROVIDING METHOD AND CONTENT PROVIDING SERVER THEREFOR

(71) Applicant: SAMSUNG ELECTRONICS CO., LTD., Suwon-si (KR)

(72) Inventors: Tae-ho Wang, Anyang-si (KR); Sin-oug Yeo, Seoul (KR); Eun-kyung Yoo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 14/370,672

(22) PCT Filed: Dec. 28, 2012

(86) PCT No.: PCT/KR2012/011768
§ 371 (c)(1),
(2) Date: Jul. 3, 2014

(87) PCT Pub. No.: WO2013/103222
PCT Pub. Date: Jul. 11, 2013

(65) Prior Publication Data
US 2015/0007047 A1    Jan. 1, 2015

(30) Foreign Application Priority Data
Jan. 3, 2012    (KR) .................. 10-2012-0000654

(51) Int. Cl.
*G06F 3/01*    (2006.01)
*H04L 29/08*    (2006.01)
(Continued)

(52) U.S. Cl.
CPC .......... *H04L 67/02* (2013.01); *G06F 3/04842* (2013.01); *H04L 67/06* (2013.01)

(58) Field of Classification Search
None
See application file for complete search history.

(56) References Cited

U.S. PATENT DOCUMENTS 7,779,358 B1 *   8/2010   Gupta ............... G06F 17/30274
                                                            715/730
8,160,607 B2     4/2012   Choi et al.
(Continued)

FOREIGN PATENT DOCUMENTS

JP    2011-519080 A    6/2011
KR    10-0788605 B1    12/2007
(Continued)

OTHER PUBLICATIONS

Communication dated Jul. 8, 2014 issued by International Searching Authority in counterpart International Application No. PCT/KR2012/011768.

*Primary Examiner* — Toan Vu
(74) *Attorney, Agent, or Firm* — Sughrue Mion, PLLC

(57) ABSTRACT

Provided is a content uploading method performed by a user terminal so as to upload content to a server. The content uploading includes operations of selecting a plurality of contents; generating an associated parameter indicating an association relationship between the plurality of contents; and uploading the plurality of contents comprising the associated parameter to the server.

12 Claims, 6 Drawing Sheets

(51) Int. Cl.
*G06F 3/0484* (2013.01)
*G06F 3/00* (2006.01)

(56) References Cited

U.S. PATENT DOCUMENTS

| | | | |
|---|---|---|---|
| 8,793,256 B2 | 7/2014 | McIntire et al. | |
| 2006/0168285 A1* | 7/2006 | Nielsen | G06F 17/3089 709/231 |
| 2007/0038931 A1* | 2/2007 | Allaire | G06Q 30/0239 715/206 |
| 2008/0215985 A1* | 9/2008 | Batchelder | G06F 17/248 715/731 |
| 2008/0270569 A1* | 10/2008 | McBride | G06F 17/30017 709/217 |
| 2009/0037967 A1* | 2/2009 | Barkan | H04N 21/222 725/105 |
| 2009/0210779 A1* | 8/2009 | Badoiu | G06F 17/3082 715/230 |
| 2010/0088726 A1* | 4/2010 | Curtis | G11B 27/034 725/45 |
| 2010/0145948 A1 | 6/2010 | Yang et al. | |
| 2011/0047248 A1 | 2/2011 | Park et al. | |
| 2011/0321072 A1* | 12/2011 | Patterson | H04N 21/44222 725/5 |
| 2012/0079013 A1* | 3/2012 | Shepstone | G06F 17/30038 709/203 |
| 2012/0124486 A1* | 5/2012 | Robinson | G06F 17/30867 715/753 |
| 2012/0251082 A1* | 10/2012 | De Vos | H04N 5/765 386/285 |
| 2012/0254759 A1* | 10/2012 | Greenberg | G06F 17/3089 715/719 |
| 2013/0018845 A1* | 1/2013 | Macaskill | H04L 67/306 707/634 |
| 2013/0166391 A1* | 6/2013 | Blow | H04L 67/06 705/14.66 |
| 2014/0032560 A1* | 1/2014 | Reese | G06F 3/0481 707/740 |
| 2014/0243044 A1 | 8/2014 | Yu et al. | |
| 2015/0074559 A1* | 3/2015 | Garcia | G06Q 50/01 715/753 |

FOREIGN PATENT DOCUMENTS

| | | |
|---|---|---|
| KR | 10-2009-0002658 A | 1/2009 |
| KR | 10-2010-0066606 A | 6/2010 |
| KR | 10-2011-0019896 A | 3/2011 |
| KR | 10-2011-0020146 A | 3/2011 |
| KR | 10-2011-0032303 A | 3/2011 |
| KR | 10-2011-0096802 A | 8/2011 |

* cited by examiner

CONTENT UPLOADING METHOD AND USER TERMINAL THEREFOR, AND ASSOCIATED CONTENT PROVIDING METHOD AND CONTENT PROVIDING SERVER THEREFOR

TECHNICAL FIELD

The present invention relates to a content uploading method and a user terminal therefor, and an associated content providing method and a content providing server therefor, which are arranged for uploading a plurality of contents having an associated parameter to a server, and allowing associated content to be easily searched for.

BACKGROUND ART

A 'social networking service (SNS)' indicates a service by which a user may build a relationship network with other unspecified users online. Users may newly build a network or may strengthen relationships with existing networks via the SNS.

In a conventional SNS, in order to upload different types of contents to a server, it is obliged to upload the contents via different paths according to the types of the contents. For example, in order to upload an image, a video, a text, etc. to the server, the image, the video, and the text have to be uploaded on different screens, respectively, via separate buttons (paths).

Also, although the contents that are uploaded via the different paths are associated in using the contents, it is difficult to display their close relations to a user.

Thus, there is a demand for a system for assigning interconnection to the contents, so that users may recognize the contents in an SNS as a total record of an event and do not recognize the contents as they are simply listed.

DETAILED DESCRIPTION OF THE INVENTION

Technical Problem

The present invention provides a content uploading method, a user terminal, an associated content providing method, and a content providing server which are arranged for uploading a plurality of contents having an associated parameter to a server, and allowing associated content to be easily searched for.

Technical Solution

According to an aspect of the present invention, there is provided a content uploading method performed by a user terminal so as to upload content to a server, the content uploading including operations of selecting a plurality of contents; generating an associated parameter indicating an association relationship between the plurality of contents; and uploading the plurality of contents including the associated parameter to the server.

The operation of generating the associated parameter may include operations of displaying the plurality of contents on one editing screen; and generating the associated parameter indicating the association relationship between the plurality of contents displayed on the one editing screen.

The plurality of contents may include at least one of still image content, text content, video content, and event content. The plurality of contents may have at least two different formats.

The content uploading method may further include operations of selecting at least one content from among the plurality of contents uploaded to the server; and displaying the at least one selected content, and information about associated content having an associated parameter equal to that of the at least one selected content.

The information about the associated content may include at least one of a thumbnail image of the associated content, link information of the associated content, and an icon indicating a category of the associated content.

The operation of selecting the plurality of contents may include operations of receiving an input of selection with respect to first content from a user; recommending second content of which association possibility with the first content that is selected by the user is equal to or greater than a predetermined reference; and receiving an input of selection with respect to the second content.

The association possibility may be calculated based on at least one of metadata generation time information and content generation position information of the first content and the second content.

The second content may include at least one of content that is pre-stored in a memory of the user terminal and content that is uploaded to the server.

According to another aspect of the present invention, there is provided an associated content providing method performed by a content providing server so as to provide associated content, the associated content providing method including operations of receiving a plurality of contents from a user terminal; generating an associated parameter indicating an association relationship between the plurality of contents; and storing the plurality of contents including the associated parameter.

According to another aspect of the present invention, there is provided a user terminal including a contents selecting unit for selecting a plurality of contents; an associated parameter generating unit for generating an associated parameter indicating an association relationship between the plurality of contents; a communication unit for uploading the plurality of contents including the associated parameter to the server; and a control unit for controlling the contents selecting unit, the associated parameter generating unit, and the communication unit.

According to another aspect of the present invention, there is provided a content providing server including a communication unit for receiving a plurality of contents from a user terminal; an associated parameter generating unit for generating an associated parameter indicating an association relationship between the plurality of contents; a storage unit for storing the plurality of contents including the associated parameter; and a control unit for controlling the communication unit, the associated parameter generating unit, and the storage unit.

Advantageous Effects

According to embodiments of the present invention, an associated parameter may be assigned to a plurality of contents having an association therebetween, so that a server may conveniently provide associated content without comparing a plurality of pieces of metadata of contents.

In particular, according to the embodiments of the present invention, various types of content may be uploaded to the server via one editing screen, and an association relationship may be set to the various types of content.

Because the same associated parameter is generated with respect to a plurality of contents that are uploaded via one editing screen, users may manage the plurality of contents, which are uploaded to the server, as a total record of an event.

MODE OF THE INVENTION

Figure 1:
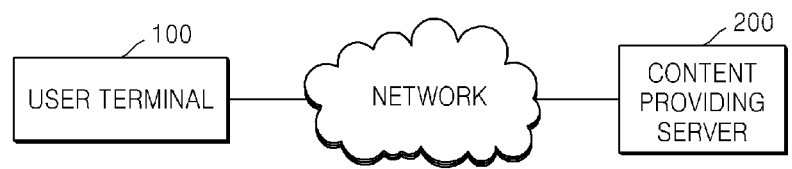
FIG. 1 is a block diagram illustrating an associated content providing system according to an embodiment of the present invention.

Terms that are used in the specification are briefly described, and the present invention is described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

One or more embodiments of the present invention will now be described more fully with reference to the accompanying drawings. However, the one or more embodiments of the present invention may be embodied in many different forms, and should not be construed as being limited to the embodiments set forth herein; rather, these embodiments are provided so that this disclosure will be thorough and complete, and will fully convey the concept of the one or more embodiments of the present invention to those of ordinary skill in the art. In the following description, well-known functions or constructions are not described in detail since they would obscure the one or more embodiments of the present invention with unnecessary detail, and like reference numerals in the drawings denote like or similar elements throughout the specification.

FIG. 1 is a block diagram illustrating an associated content providing system according to an embodiment of the present invention.

As illustrated in FIG. 1, the associated content providing system may include a user terminal 100 and a content providing server 200.

The user terminal 100 is a device capable of uploading a plurality of contents to the content providing server 200 or displaying to a user a plurality of contents that are uploaded to the content providing server 200.

The user terminal 100 may be embodied in various ways. For example, in the present embodiment, the user terminal 100 may be a desktop computer, a mobile phone, a smartphone, a laptop computer, a terminal for digital broadcasting, a personal digital assistant (PDA), a portable multimedia player (PMP), a navigation device, a tablet personal computer (PC), an MP3 player, a digital camera, consumer electronic (CE) devices, etc. The CE devices may include a digital television (TV), an internet protocol TV (IPTV), a refrigerator having a display device, an air conditioner, or the like.

The user terminal 100 may be connected to the content providing server 200 via a network. Thus, the user terminal 100 may communicate by wire or wirelessly with the content providing server 200. For example, the user terminal 100 may transmit a plurality of contents or various types of information related to the plurality of contents to the content providing server 200. Also, the user terminal 100 may receive various services from the content providing server 200.

The content providing server 200 is a server capable of providing various contents to the user terminal 100. According to the present embodiment, the content providing server 200 may provide associated content, that is, content associated with predetermined content, to the user terminal 100.

The content providing server 200 may receive a plurality of contents from the user terminal 100. In this case, according to the present embodiment, the content providing server 200 may receive a plurality of contents including an associated parameter from the user terminal 100.

According to another embodiment, the content providing server 200 may receive a plurality of contents not including an associated parameter from the user terminal 100 and may directly assign an associated parameter to the plurality of received contents.

The content providing server 200 may be a social networking service (SNS) server. The SNS server is a server for providing an SNS. In a case where the content providing server 200 is the SNS server, the user terminal 100 may be a terminal of a user who joined an SNS service.

Hereinafter, a user terminal according to the present embodiment will now be described in detail with reference to FIGS. 2 and 3.

Figure 2:
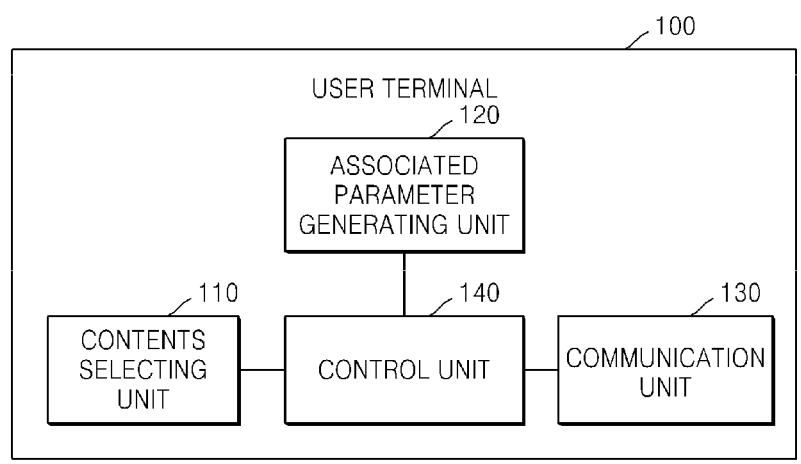
FIG. 2 is a block diagram illustrating a user terminal for uploading content, according to an embodiment of the present invention.

FIG. 2 is a block diagram illustrating the user terminal for uploading content, according to an embodiment of the present invention.

As illustrated in FIG. 2, the user terminal 100 may include a contents selecting unit 110, an associated parameter generating unit 120, a communication unit 130, and a control unit 140. However, not all shown elements are necessary elements. That is, the user terminal 100 may be embodied with more or less elements than the shown elements.

The contents selecting unit 110 may select content. According to the present embodiment, the contents selecting unit 110 may select the content, based on an input from a user of the user terminal 100. That is, according to the present embodiment, the contents selecting unit 110 may be a type of a user input unit.

The user input unit generates input data for allowing the user to control operations of a terminal. The user input unit may include a key pad, a dome switch, a touch pad (a pressure resistive type touch pad/a touch capacitive type touch pad) a jog wheel, a jog switch, or the like. In particular, when the touch pad and a display unit to be described later form a layer structure and thus are formed as a touch screen, this may be referred to as a touch screen.

In the present embodiment, content may include at least one of still image content (e.g., a photo, a picture, etc.), text content (e.g., a poem, a novel, a letter, a work file, a detailed description about content, etc.), video content (e.g., a private video, a movie, a music video, a Youtube video, a TV program video, etc.), and music content (e.g., music, musical performance, radio, etc.), event content (content about a schedule, an anniversary, a travel plan, etc.). That is, the content according to the present embodiment may include not only multimedia content but also may include various types of content.

The content according to the present embodiment may be uploaded to the content providing server 200 or may be pre-stored in a memory of the user terminal 100. In the present embodiment, a plurality of contents may have at least two different formats.

The associated parameter generating unit 120 may generate an associated parameter about a plurality of contents. In the present embodiment, the associated parameter means an index indicating an association relationship that exists between the plurality of contents.

For example, the associated parameter generating unit 120 may generate a same associated parameter for a plurality of contents that are displayed for an upload on one editing screen. In this case, an association relationship between the plurality of contents may be a relationship by which they are uploaded via one editing screen.

According to the present embodiment, the associated parameter may be a value that is randomly generated. According to another embodiment, the associated parameter may be generated based on an identifier (ID) value of an uploaded editing screen.

According to the present embodiment, when first content assigned with an associated parameter, and second content not assigned with the associated parameter are displayed on one editing screen, the associated parameter generating unit 120 may assign the associated parameter equal to that of the first content to the second content.

The communication unit 130 may include one or more elements for allowing wired or wireless communication between the user terminal 100 and the content providing server 200. For example, the communication unit 130 may include a mobile communication module, a wireless internet module, a wired internet module, a short-distance communication module, a position information module, etc.

The mobile communication module exchanges a wireless signal with a base station and the content providing server 200 through a mobile communication network. Here, the wireless signal may include a voice call signal, a video call signal, or various types of data according to an exchange of text/multimedia messages.

The short-distance communication module is arranged for short-distance communication. Examples of the short-distance communication may include Bluetooth, Radio Frequency Identification (RFID), infrared Data Association (IrDA), Ultra Wideband (UWB), ZigBee, Near Field Communication (NFC), etc.

The position information module is a module for checking or obtaining a position of the user terminal 100. An example of the position information module is a global positioning system (GPS) module. The GPS module receives a plurality of pieces of position information from a plurality of satellites. Here, each of the plurality of pieces of position information may include information about coordinates consisting of latitude and longitude. For example, the GPS module may obtain three different distances by measuring exact times and distances from three or more satellites and may exactly calculate a current position by using the three different distances according to a triangle method. Distance information and time information may be obtained from each of the three satellites and an error may be corrected via one satellite. In particular, the GPS module may obtain from the position information not only a position of latitude, longitude, and altitude but also may obtain three-dimensional (3D) speed information and an exact time.

The communication unit 130 may upload a plurality of contents to the content providing server 200. Here, according to the present embodiment, the communication unit 130 may upload to the content providing server 200 a plurality of contents, each including an associated parameter. The communication unit 130 may receive associated content that is associated with user-selected content or information about the associated content.

The control unit 140 may generally control the contents selecting unit 110, the associated parameter generating unit 120, and the communication unit 130.

Figure 3:
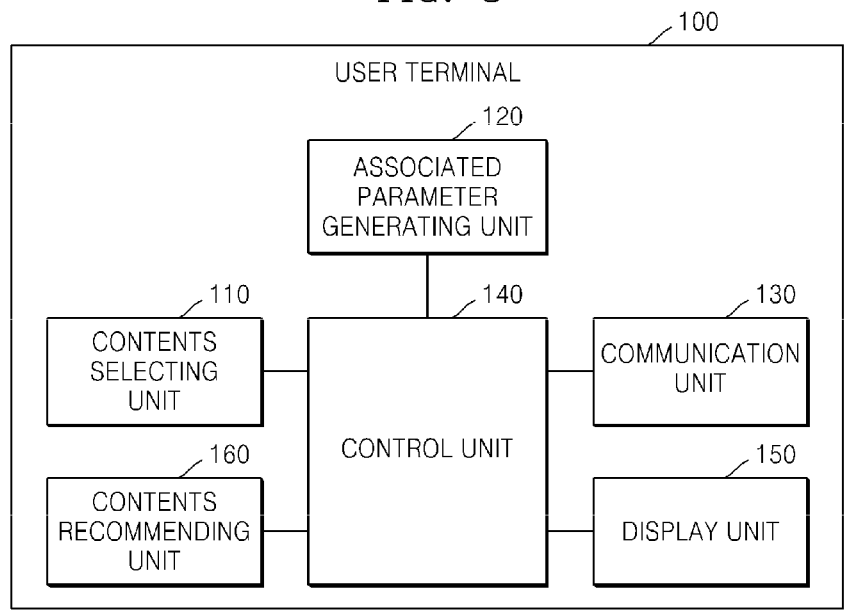
FIG. 3 is a block diagram illustrating the user terminal, according to another embodiment of the present invention.

FIG. 3 is a block diagram illustrating the user terminal, according to another embodiment of the present invention.

As illustrated in FIG. 3, according to the present embodiment, the user terminal 100 may further include a display unit 150 and a contents recommending unit 160, in addition to the contents selecting unit 110, the associated parameter generating unit 120, the communication unit 130, and the control unit 140.

The display unit 150 displays and outputs information processed by the user terminal 100. For example, the display unit 150 may display a plurality of contents on one editing screen. Here, in the present embodiment, the plurality of contents may have at least two different formats.

The display unit 150 may display associated content having an associated parameter equal to that of user-selected content. Also, the display unit 150 may display information about the associated content having the associated parameter equal that of the user-selected content. In the present embodiment, the information about the associated content may include a thumbnail image, link information of the associated content, an icon indicating a category of the associated content, or the like.

The link information means information about a content access path via which the user terminal 100 may access particular content. An example of the link information may include a universal resource locator (URL).

As described above, when the display unit and the touch pad form a layer structure and thus are formed as a touch screen, the display unit may be used as both an output device and an input device. The display unit may include at least one of a liquid crystal display (LCD), a thin film transistor-liquid crystal display (TFT-LCD), an organic light-emitting diode display, a flexible display, and a 3D display. Also, according to a type of the user terminal 100, at least two of the display units may exist. The touch screen may detect not only a touch input position and a touched area but may also detect a touch input pressure. Also, the touch screen may detect not only an actual touch but also may detect a proximity touch.

The contents recommending unit 160 may recommend second content of which an association possibility with first content that is user-selected content is equal to or greater than a predetermined reference. When a user selects the recommended second content, the first content and the second content may be uploaded to the content providing server 200 via one editing screen.

According to the present embodiment, the contents recommending unit 160 may calculate the association possibility between the first content and the second content, based on metadata generation time information and content generation position information about each of the first and second contents. That is, the contents recommending unit 160 may recommend the second content that matches a metadata generation time or a content generation position of the first content.

According to the present embodiment, the recommended content (the second content) may be at least one of content pre-stored in a memory of the user terminal 100 and content uploaded to the content providing server 200.

The control unit 140 may generally control not only the contents selecting unit 110, the associated parameter generating unit 120, and the communication unit 130 but also may control the display unit 150 and the contents recommending unit 160.

Figure 4:
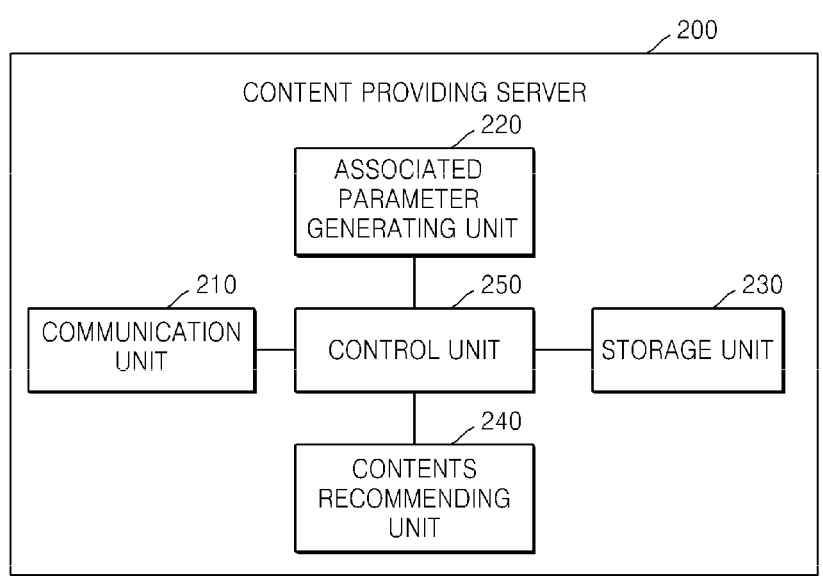
FIG. 4 is a block diagram illustrating a content providing server, according to an embodiment of the present invention.

FIG. 4 is a block diagram illustrating a content providing server, according to an embodiment of the present invention.

As illustrated in FIG. 4, a content providing server 200 may include a communication unit 210, an associated parameter generating unit 220, a storage unit 230, a contents recommending unit 240, and a control unit 250. However, not all shown elements are necessary elements. That is, the content providing server 200 may be embodied with more or less elements than the shown elements.

The communication unit 210 may receive a plurality of contents from the user terminal 100. Here, according to the present embodiment, the communication unit 210 may receive the plurality of contents via one editing screen from the user terminal 100. In the present embodiment, the plurality of contents may have at least two different formats. For example, the communication unit 210 may receive at least two types of contents from among still image content, text content, video content, and event content.

The communication unit 210 may receive from the user terminal 100 an input of selection with respect to at least one content from among a plurality of contents that include an associated parameter and are stored in the storage unit 230. In this case, the communication unit 210 may provide the at least one selected content to the user terminal 100. Then, the communication unit 210 may provide to the user terminal 100 associated content having an associated parameter equal to that of the at least one selected content and/or information about the associated content.

According to the present embodiment, the information about the associated content may include a thumbnail image, link information of the associated content, an icon indicating a category of the associated content, or the like.

The associated parameter generating unit 220 may generate the associated parameter indicating an association relationship between the plurality of contents. In the present embodiment, the plurality of contents may indicate a contents group that is classified according to a predetermined reference. For example, the plurality of contents may indicate the contents group of contents that are received via one editing screen.

The plurality of contents may indicate a contents group of contents that are uploaded within a predetermined time range from the user terminal 100. For example, the plurality of contents may indicate contents that are uploaded within 10 minutes from a time when initial content was uploaded.

According to the present embodiment, the associated parameter generating unit 220 may randomly generate the associated parameter. According to another embodiment, the associated parameter generating unit 220 may generate the associated parameter, based on an ID value of an editing screen.

According to the present embodiment, when first content assigned with an associated parameter, and second content not assigned with the associated parameter are displayed on one editing screen, the associated parameter generating unit 220 may assign the associated parameter equal to that of the first content to the second content.

The storage unit 230 may store the plurality of contents including the associated parameter. The storage unit 230 may store information about a plurality of associated contents having the same associated content. According to the present embodiment, the storage unit 230 may store a plurality of pieces of metadata about the plurality of contents.

The contents recommending unit 240 may recommend the second content of which an association possibility with the first content that is user-selected content is equal to or greater than a predetermined reference. According to the present embodiment, the contents recommending unit 240 may calculate the association possibility between the first content and the second content, based on metadata generation time information and content generation position information about each of the first and second contents. That is, the contents recommending unit 240 may recommend the second content that matches a metadata generation time or a content generation position of the first content.

The control unit 250 may obtain an associated parameter from at least one user-selected content. Then, the control unit 250 may display associated content having an associated parameter equal to the obtained associated parameter.

The control unit 250 may generally control the communication unit 210, the associated parameter generating unit 220, the storage unit 230, and the contents recommending unit 240.

Hereinafter, a method of uploading a plurality of contents including an associated parameter, which is performed by the user terminal 100 using elements of the user terminal 100, will be described in detail with reference to FIG. 5.

Figure 5:
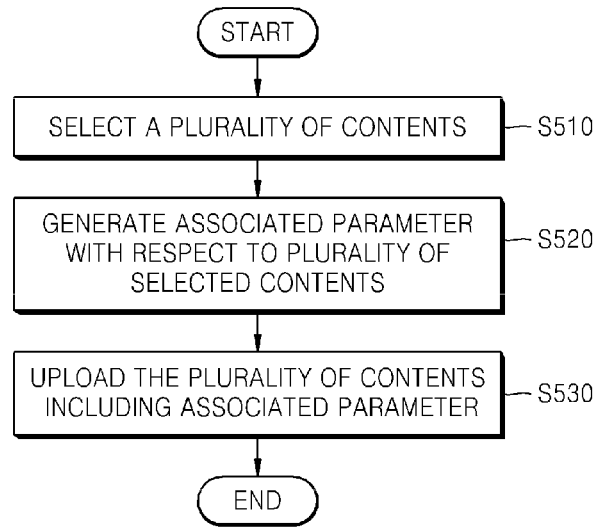
FIG. 5 is a flowchart of a content uploading method, according to an embodiment of the present invention.

FIG. 5 is a flowchart of a content uploading method, according to an embodiment of the present invention.

Referring to FIG. 5, the content uploading method according to the present embodiment includes operations that are processed in chronological order by the user terminal 100 shown in FIGS. 2 and 3. Thus, hereinafter, although the above descriptions of the user terminal 100 shown in FIGS. 2 and 3 are omitted, the descriptions may also be applied to the content uploading method of FIG. 5.

The user terminal 100 may select a plurality of contents (operation S510). According to the present embodiment, the user terminal 100 may select content based on a user selection. That is, a user may select the content to be uploaded to the content providing server 200 by using the user terminal 100 of the user.

According to the present embodiment, the content selected by the user terminal 100 may be content pre-stored in the content providing server 200, recommended content recommended by the user terminal 100, content stored in the user terminal 100, or the like.

According to the present embodiment, the user terminal 100 may display the plurality of selected contents on one editing screen. By doing so, the user may check the plurality of contents for which the same associated parameter will be generated.

According to the present embodiment, the user terminal 100 may select a plurality of contents having different formats. For example, the user terminal 100 may select both still image content and event content together. Alternatively, the user terminal 100 may select both video content and text content together. In this case, the plurality of contents having different formats (e.g., the still image content and the event content) may be displayed on one editing screen.

The user terminal 100 may generate an associated parameter indicating an association relationship between the plurality of selected contents (operation S520). For example, when photo content A, video content B, and event content C are selected, the user terminal 100 may generate the same associated parameter '000000' with respect to the photo content A, the video content B, and the event content C.

According to the present embodiment, the user terminal 100 may generate the same associated parameter with respect to the plurality of contents displayed on one editing screen. In general, there is a high possibility that an association relationship may exist between a plurality of contents that are uploaded via one editing screen, so that the user terminal 100 may generate the same associated parameter with respect to the plurality of contents to be uploaded via one editing screen.

According to the present embodiment, when a plurality of contents having different formats are displayed on one editing screen, the user terminal 100 may generate the same associated parameter with respect to the plurality of contents having different formats. Thus, according to the present embodiment, although the plurality of contents have different formats, an association relationship may be set therefor.

The user terminal 100 may upload the plurality of contents including the generated associated parameter to the content providing server 200 (operation S530). That is, each of the plurality of contents uploaded to the content providing server 200 has the same associated parameter.

For example, because a plurality of contents that are uploaded via one editing screen have an association relationship in that they are uploaded via one editing screen, each of the plurality of contents may have the same associated parameter 'xxxxx'.

The plurality of contents uploaded to the content providing server 200 may include a plurality of contents having two different formats. For example, still image content and event content may be uploaded together to the content providing server 200. Thus, according to the present embodiment, the user terminal 100 may upload the plurality of contents having different formats to the content providing server 200 via the same path.

According to the present embodiment, the user may select, by using the user terminal 100, at least one content from among the plurality of contents including the associated parameter which are uploaded to the content providing server 200. In this case, the user terminal 100 may receive, from the content providing server 200, and display information about associated content having an associated parameter that is equal to that of the at least one selected content.

Hereinafter, a method of providing associated content, the method performed by the content providing server 200 using elements of the content providing server 200, will be described in detail with reference to FIG. 6.

Figure 6:
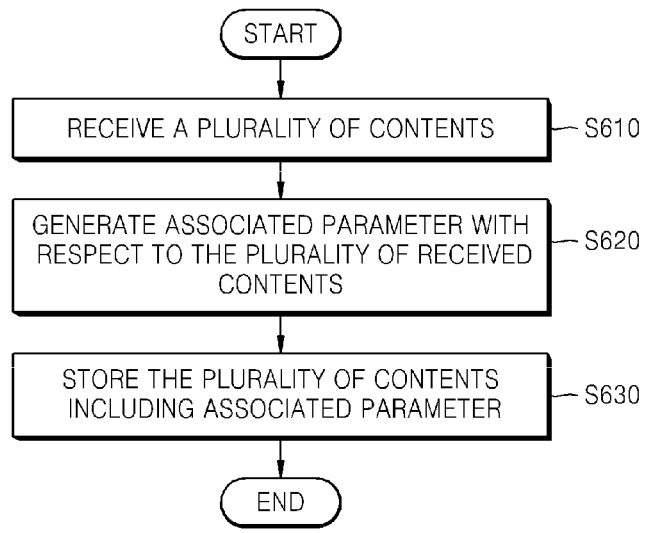
FIG. 6 is a flowchart of an associated content providing method performed by a content providing server, according to an embodiment of the present invention.

FIG. 6 is a flowchart of an associated content providing method performed by a content providing server, according to an embodiment of the present invention.

Referring to FIG. 6, the associated content providing method according to the present embodiment includes operations that are processed in chronological order by the content providing server 200 shown in FIG. 4. Thus, hereinafter, although the above descriptions of the content providing server 200 shown in FIG. 4 are omitted, the descriptions may also be applied to the associated content providing method of FIG. 6.

The content providing server 200 may receive a plurality of contents from the user terminal 100 (operation S610). According to the present embodiment, the user terminal 100 may receive the plurality of contents via one editing screen from the user terminal 100. In the present embodiment, the one editing screen may be provided by the user terminal 100 or by the content providing server 200.

That is, according to the present embodiment, the content providing server 200 may receive the plurality of contents via one editing screen provided by the user terminal 100, and may display the plurality of received contents on one editing screen provided by the content providing server 200.

The content providing server 200 may receive the plurality of contents having at least two different formats via one editing screen.

The content providing server 200 may generate an associated parameter indicating an association relationship between the plurality of received contents (operation S620). The content providing server 200 may store the plurality of contents including the generated associated parameter (operation S630).

According to the present embodiment, the content providing server 200 may generate the associated parameter with respect to the plurality of contents, may store the plurality of contents including the associated parameter, and thus may conveniently provide the associated content to the user, without using metadata of content.

Figure 7:
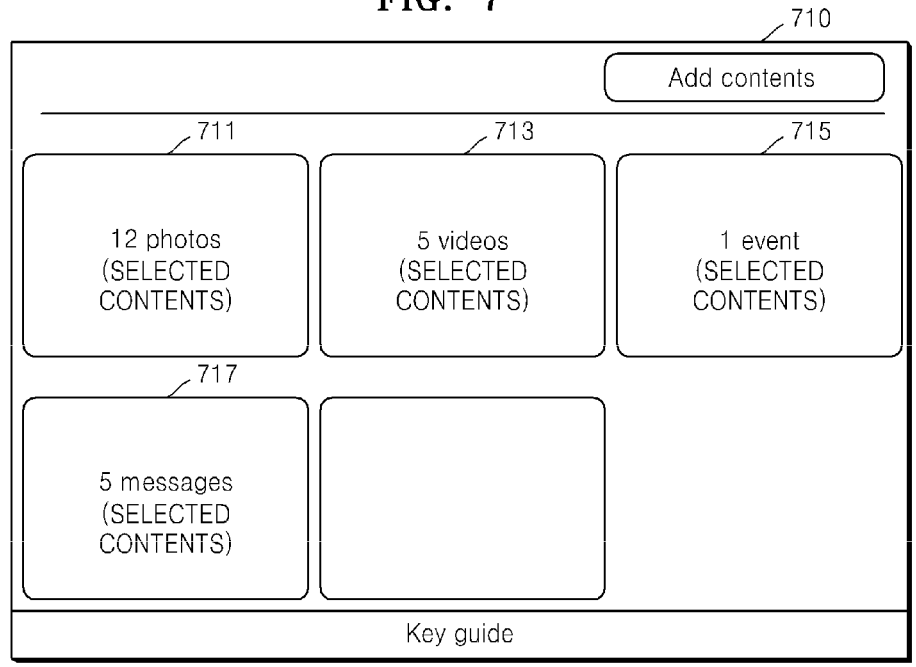
FIG. 7 illustrates an example of a content uploading screen, according to an embodiment of the present invention.

FIG. 7 illustrates an example of a content uploading screen, according to an embodiment of the present invention.

As illustrated in FIG. 7, one editing screen 710 may display various types of content. For example, it is assumed that a user travelled to the city of Busan on a family trip on Dec. 30, 2011. The user may display 12 photos 711 and 5 videos 713 that are taken in Busan, a plan 715 for the family trip which was previously loaded on November 2011, and 5 reviews 717 about the family trip on the one editing screen 710.

According to the present embodiment, the user terminal 100 may generate the same associated parameter with respect to a plurality of contents displayed on the one editing screen 710. Then, the user terminal 100 may include the associated parameter in the plurality of contents and then may upload the plurality of contents to the content providing server 200.

For example, the user terminal 100 may generate an associated parameter '000000' with respect to each of the 12 photos 711 and the 5 videos 713 that are taken in Busan, the plan 715 for the family trip which was previously loaded on November 2011, and the 5 reviews 717 about the family trip.

According to another embodiment, the content providing server 200 may receive a plurality of contents via one editing screen from the user terminal 100. Then, the content providing server 200 may generate the same associated parameter with respect to the plurality of received contents.

That is, an associated parameter with respect to a plurality of contents displayed on one editing screen may be generated by the user terminal 100 or by the content providing server 200.

Figure 8:
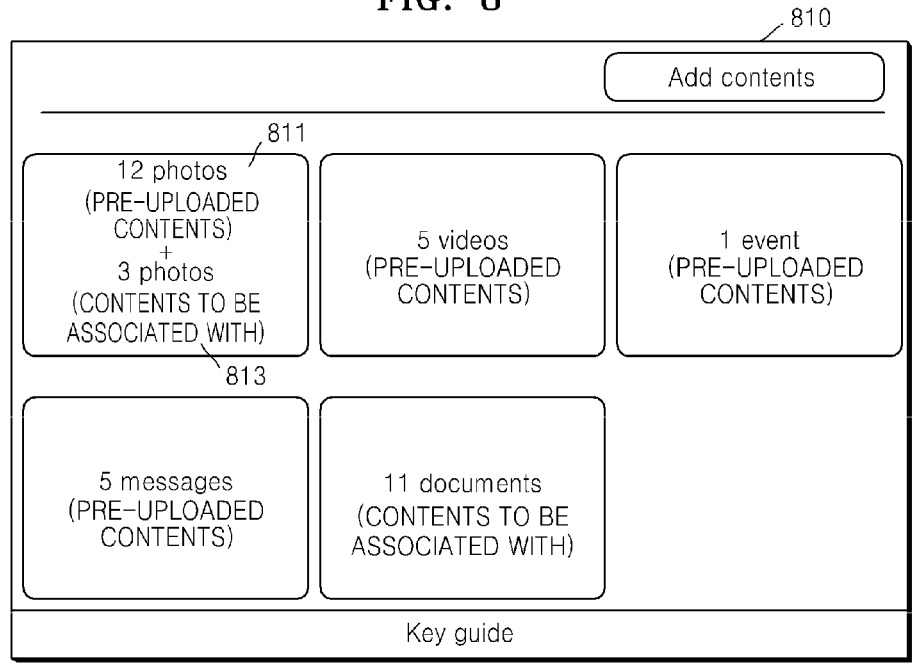
FIG. 8 illustrates an example of a content uploading screen, according to another embodiment of the present invention.

FIG. 8 illustrates an example of a content uploading screen, according to another embodiment of the present invention.

According to the present embodiment, the user terminal 100 may select content 813 to be additionally associated with uploaded content 811. In this case, the uploaded content 811 and the content 813 to be additionally associated may be displayed on one editing screen 810.

For example, a user who uploaded 12 Busan trip photos, 5 videos, and 1 event to the content providing server 200 may want to additionally upload 3 Busan trip photos and 11 documents about Busan to the content providing server 200.

In this case, the user terminal 100 or the content providing server 200 may display the 12 Busan trip photos, the 5 videos, and the 1 event on one editing screen, and may additionally display the 3 Busan trip photos and the 11 documents about Busan.

Then, the user terminal 100 or the content providing server 200 may assign an associated parameter, which is equal to that of the uploaded content 811, to the content 813 to be additionally associated. For example, in a case where the 12 Busan trip photos, the 5 videos, and the 1 event have the same associated parameter of '12AD36', the 3 Busan trip photos and the 11 documents about Busan that are additionally displayed may also have the associated parameter of '12AD36'.

Thus, when the user selects at a later time a Busan trip photo A from among a plurality of contents uploaded to the content providing server 200, the 3 Busan trip photos and the 11 documents about Busan that are additionally displayed may also be searched for as associated content of the Busan trip photo A.

According to another embodiment, the user may upload on Nov. 1, 2011 event content about a family trip to be on Jan. 3, 2012 to the content providing server 200. Then, on Jan. 10, 2012, the user may select the event content about the family trip on Jan. 3, 2012, which was uploaded on Nov. 1, 2011, and may additionally upload photos or videos that were taken during an actual family trip via one editing screen. In this case, the same associated parameter is generated with respect to the event content about the family trip on Jan. 3, 2012, which was uploaded on Nov. 1, 2011, and the photos or the videos that were taken during the actual family trip and are additionally uploaded on Jan. 10, 2012.

Thus, when the user selects event content about the family trip on Jan. 3, 2012 at a later time, the photos or the videos that were taken during the actual family trip and are additionally uploaded are displayed as associated content.

Figure 9:
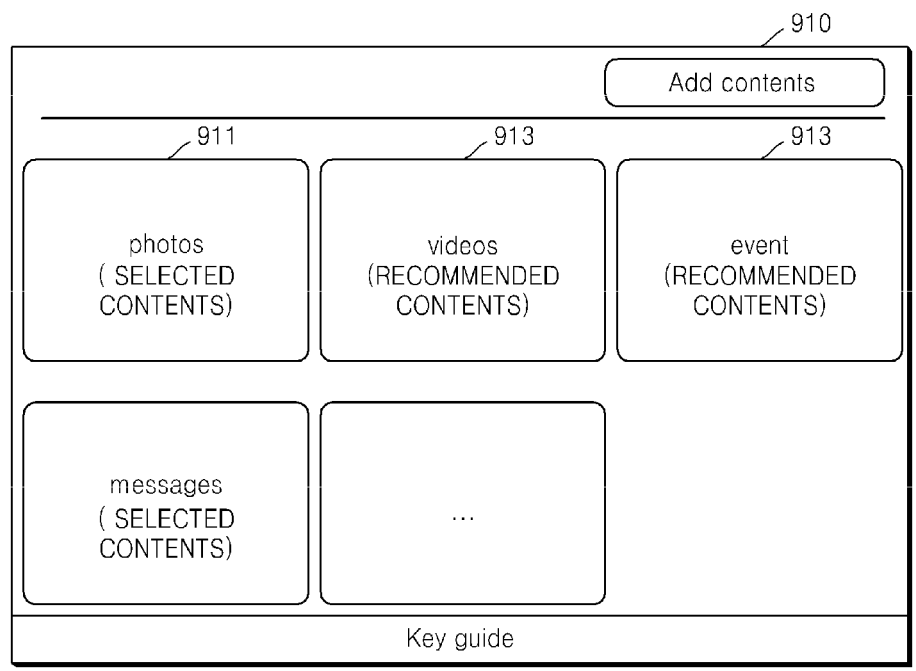
FIG. 9 illustrates an example of a recommended content uploading screen, according to an embodiment of the present invention.

FIG. 9 illustrates an example of a recommended content uploading screen, according to an embodiment of the present invention.

When predetermined content 911 is selected by a user, the user terminal 100 or the content providing server 200 may additionally display recommended content 913 on one editing screen. Here, the user terminal 100 or the content providing server 200 may recommend content having an association possibility with the content 911 that is selected by the user, based on at least one of metadata generation time information of the content and content generation position information.

For example, when a photo A that was generated on Nov. 1, 2011 is selected by the user, the user terminal 100 or the content providing server 200 may check a plurality of pieces of metadata of a plurality of contents and may recommend event content E including a photo B, a photo C, a video D, and schedule information about a family trip on Nov. 1, 2011.

Also, when a photo X that was taken in Busan is selected by the user, the user terminal 100 or the content providing server 200 may check a plurality of pieces of generation position information included in the plurality of contents, and may recommend a photo Y and a video Z that were taken in Busan. In general, when CE devices such as a camera, a digital camera, etc. have a GPS function, generation position information may be included in content. Thus, the user terminal 100 or the content providing server 200 may check generation position information of the content and may recommend content having a high association possibility with the user-selected content.

In this case, the user may check the recommended content having the high association possibility with the user-selected content, and if the recommended content is actually associated with the user-selected content, the user may allow an associated parameter that is equal to that of the user-selected content, to be generated with respect to the recommended content.

Figure 10:
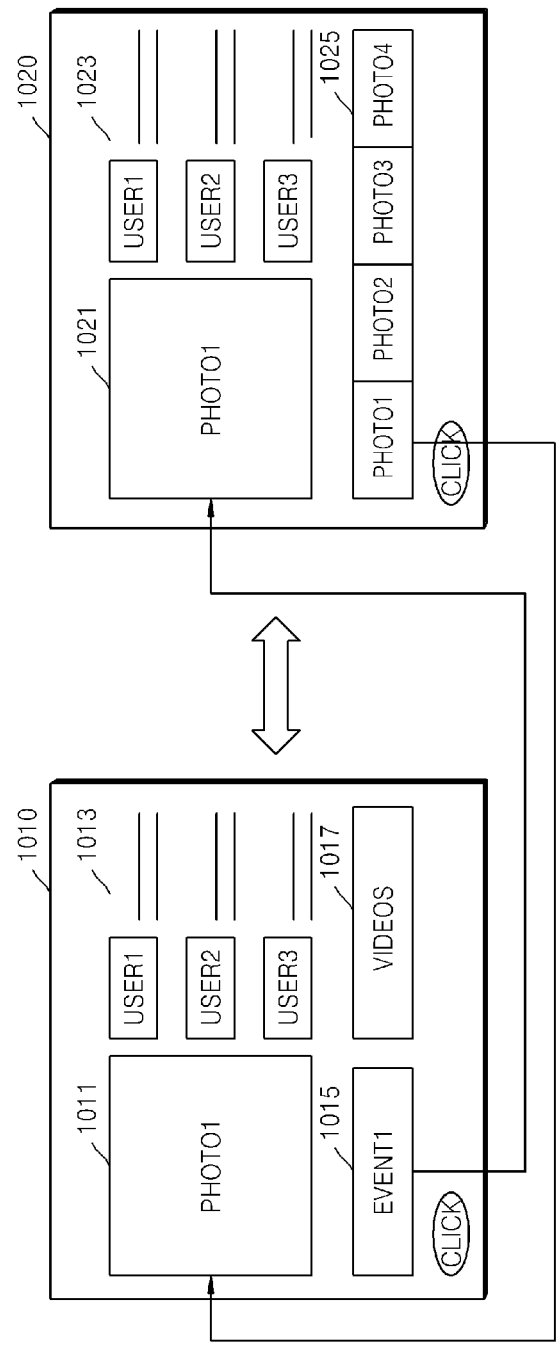
FIG. 10 illustrates screens for providing information about associated content, according to an embodiment of the present invention.

FIG. 10 illustrates screens for providing information about associated content, according to an embodiment of the present invention.

As illustrated in FIG. 10, when content including an associated parameter is selected, not only the selected content but also information about associated content having the same associated parameter as the selected content may be displayed. According to the present embodiment, the associated content may be displayed or a thumbnail image of the associated content, link information of the associated content, an icon indicating a category of the associated content, etc. may be displayed.

For example, when a photo 1 is selected by a user, as shown on a screen 1010, a photo1 1011, comments 1013 about the photo1 1011, an Event1 1015 and Videos 1016 that are associated contents having the same associated parameter as the photo1 1011, or the like may be displayed.

Here, the Event1 1015 may be displayed in the form of an icon indicating a category of event content. For example, in a case where an event is a first-birthday party, an emoticon in the form of a baby photo may be displayed, or in a case where the event is a birthday, an emoticon in the form of a cake may be displayed.

The Event1 1015 may include link information. Thus, when the user clicks or touches the Event1 1015, a screen 1020 may be displayed.

On the screen 1020, an Event1 1021 may be displayed as main content, and comments 1023 about an event, and Photo1, Photo2, Photo3, and Photo4 1025 as associated content having the same associated parameter as the Event1 1021 may be displayed.

According to the embodiments of the present invention, when associated content is photo content, the associated content may be displayed in the form of an image. For example, the Photo1, Photo2, Photo3, and Photo4 1025 that are associated contents of the Event1 1021 may be displayed in the form of thumbnails.

According to the embodiments of the present invention, the Photo1 1025 may also include link information. Thus, when the user clicks or touches the Photo1 1025, the user may return to the screen 1010.

The invention may also be embodied as programmed commands to be executed by various computer means, which may then be recorded in a computer readable recording medium. The computer readable recording medium may include one or more of the programmed commands, data files, data structures, or the like. The programmed commands recorded to the computer readable recording medium may be particularly designed or configured for the invention or may be of those well known to one of ordinary skill in the art. Examples of the computer readable recording medium include magnetic media including hard disks, magnetic tapes, and floppy disks, optical media including CD-ROMs, and DVDs, magneto-optical media including optical disks, and a hardware apparatus designed to store and execute the programmed commands in read-only memory (ROM), random-access memory (RAM), flash memories, and the like. Examples of the programmed commands include not only machine codes generated by a compiler but also a high-level programming language to be executed in a computer by using an interpreter.

According to one or more of the above embodiments of the present invention, an associated parameter may be assigned to a plurality of contents having an association therebetween, so that the content providing server 200 may conveniently provide associated content without comparing a plurality of pieces of metadata of contents.

In particular, according to one or more of the above embodiments of the present invention, various types of content may be uploaded to the content providing server 200 via one editing screen, and an association relationship may be set to the various types of content.

Since the same associated parameter is generated with respect to a plurality of contents that are uploaded via one editing screen, users may manage the plurality of contents, which are uploaded to the content providing server 200, as a total record of an event.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A content uploading method performed by a user terminal so as to upload content to a server, the content uploading method comprising:
   receiving an input selecting a plurality of contents;
   generating data indicating an association relationship between the selected plurality of contents;
   uploading the selected plurality of contents to the server, each of the selected plurality of contents comprising the data;
   selecting at least one content from among the plurality of contents uploaded to the server; and
   displaying the at least one selected content, and information about associated content having data equal to that of the at least one selected content,
   wherein the receiving of the input comprises:
      receiving a user input selecting first content;
      recommending second content of which association possibility with the first content is equal to or greater than a predetermined reference; and
      receiving a user input selecting the second content, and
   wherein the second content comprises at least one of content that is pre-stored in a memory of the user terminal and content that is uploaded to the server.

2. The content uploading method of claim 1, wherein the generating of the data comprises:
   displaying the selected plurality of contents on one editing screen of a display of the user terminal,
   wherein the data indicates the association relationship between the plurality of contents displayed on the one editing screen.

3. The content uploading method of claim 1, wherein the plurality of contents have at least two different formats.

4. The content uploading method of claim 1, wherein the information about the associated content comprises at least one of a thumbnail image of the associated content, link information of the associated content, and an icon indicating a category of the associated content.

5. The content uploading method of claim 1, wherein the association relationship indicates that the selected plurality of contents are uploaded via one editing screen.

6. A content uploading method performed by a user terminal so as to upload content to a server, the content uploading method comprising:
   receiving an input selecting a plurality of contents;
   generating data indicating an association relationship between the selected plurality of contents;
   uploading the selected plurality of contents to the server, each of the selected plurality of contents comprising the data;
   selecting at least one content from among the plurality of contents uploaded to the server; and
   displaying the at least one selected content, and information about associated content having data equal to that of the at least one selected content,
   wherein the receiving of the input comprises:
      receiving a user input selecting first content;
      recommending second content of which association possibility with the first content is equal to or greater than a predetermined reference; and
      receiving a user input selecting the second content, and
   wherein the association possibility is calculated based on at least one of metadata generation time information and content generation position information of the first content and the second content.

7. An associated content providing method performed by a content providing server so as to provide associated content, the associated content providing method comprising:
   receiving a plurality of contents from a user terminal;
   generating data indicating an association relationship between the plurality of contents;
   storing the plurality of contents, each of the plurality of contents comprising the data;
   receiving an input selecting at least one content from among the plurality of contents; and
   providing the at least one selected content, and information about associated content having data equal to that of the at least one selected content,
   wherein the plurality of contents are selected, by the user terminal, by receiving a user input selecting first content, recommending second content of which association possibility with the first content is equal to or greater than a predetermined reference, and receiving a user input selecting the second content, and wherein the second content comprises at least one of content that is pre-stored in a memory of the user terminal and content that is uploaded to the content providing server.

8. The associated content providing method of claim 7, wherein the generating of the data comprises:
   receiving the plurality of contents from the user terminal via one editing screen; and
   generating the data indicating the association relationship between the plurality of contents received via the one editing screen.

9. The associated content providing method of claim 7, wherein the providing of the information comprises:
   obtaining data from the at least one selected content; and
   displaying the associated content having the data equal to the obtained data.

10. The associated content providing method of claim 7, wherein the receiving of the plurality of contents comprises:
    receiving an input of selection with respect to first content;
    recommending second content of which an association possibility with the selected first content is equal to or greater than a predetermined reference; and
    receiving an input of selection with respect to the second content.

11. A user terminal comprising:
    a communication interface configured to communicate with a server;
    a display configured to display and output information processed by the user terminal; and
    at least one processor configured to:
      receive an input selecting a plurality of contents by receiving a user input selecting first content, recommending second content of which association possibility with the first content is equal to or greater than a predetermined reference, and receiving a user input selecting the second content,
      generate data indicating an association relationship between the selected plurality of contents,
      control the communication interface to upload the selected plurality of contents to the server, each of the selected plurality of contents comprising the data;
      select at least one content from among the plurality of contents uploaded to the server; and
      display the at least one selected content, and information about associated content having data equal to that of the at least one selected content,
    wherein the second content comprises at least one of content that is pre-stored in a memory of the user terminal and content that is uploaded to the server.

12. A content providing server comprising:
    a communication interface configured to communicate with a user terminal;
    at least one processor configured to:
      control the communication interface to receive a plurality of contents from the user terminal,
      generate data indicating an association relationship between the plurality of contents,
      receive an input of selection with respect to at least one content from among the plurality of contents, and
      provide the at least one selected content, and information about associated content having data equal to that of the at least one selected content; and
    at least one memory for storing the plurality of contents, each of the plurality of contents comprising the data,
    wherein the plurality of contents are selected, by the user terminal, by receiving a user input selecting first content, recommending second content of which association possibility with the first content is equal to or greater than a predetermined reference, and receiving a user input selecting the second content, and
    wherein the second content comprises at least one of content that is pre-stored in a memory of the user terminal and content that is uploaded to the content providing server.

* * * * *